United States Patent
Anzai

(10) Patent No.: US 12,478,000 B2
(45) Date of Patent: Nov. 25, 2025

(54) PLANT CULTIVATION METHOD

(71) Applicant: Satoshi Anzai, Yokohama (JP)

(72) Inventor: Satoshi Anzai, Yokohama (JP)

( * ) Notice: Subject to any disclaimer, the term of this patent is extended or adjusted under 35 U.S.C. 154(b) by 97 days.

(21) Appl. No.: 17/783,419

(22) PCT Filed: Dec. 3, 2020

(86) PCT No.: PCT/JP2020/045001
§ 371 (c)(1),
(2) Date: Jun. 8, 2022

(87) PCT Pub. No.: WO2021/117593
PCT Pub. Date: Jun. 17, 2021

(65) Prior Publication Data
US 2023/0009084 A1    Jan. 12, 2023

(30) Foreign Application Priority Data

Dec. 9, 2019 (JP) ................... 2019-222398

(51) Int. Cl.
*A01G 7/02* (2006.01)
*A01G 7/06* (2006.01)

(52) U.S. Cl.
CPC ........ *A01G 7/02* (2013.01); *A01G 7/06* (2013.01)

(58) Field of Classification Search
CPC ............ A01G 7/02; A01G 7/06; A01G 31/02
See application file for complete search history.

(56) References Cited

U.S. PATENT DOCUMENTS 5,561,944 A * 10/1996 Ismail ............... A01G 7/02
                                                   71/1
5,816,498 A * 10/1998 Smith, Jr. ........... A01G 7/06
                                                   239/159
(Continued)

FOREIGN PATENT DOCUMENTS

CN    208691875 U    4/2019
JP    10884530 A     4/1996
(Continued)

OTHER PUBLICATIONS

Translation of CN_105993726_A (Year: 2016).*
(Continued)

*Primary Examiner* — Joshua D Huson
*Assistant Examiner* — Edgar Reyes
(74) *Attorney, Agent, or Firm* — CANTOR COLBURN LLP

(57) ABSTRACT

Provided is a plant cultivation method that promotes plant growth and improves plant quality; also provided is a plant cultivation device. The plant cultivation method uses a nutrient liquid supply device that supplies a nutrient liquid to a plant, a fine bubble-generating device, a spraying device, and a control device. The plant cultivation method carries out plant cultivation by supplying the nutrient liquid in mist form, and comprises a first step in which an oxygen-containing gas is supplied as the gas into the nutrient liquid and the fine bubble-containing nutrient liquid is sprayed on the leaf surface of a plant, and a second step in which, after the first step, a carbon dioxide-containing gas is supplied as the gas into the nutrient liquid and the fine bubble containing nutrient liquid is sprayed on the leaf surface of the plant.

2 Claims, 3 Drawing Sheets

(56) References Cited

U.S. PATENT DOCUMENTS

| | | | | |
|---|---|---|---|---|
| 6,817,541 | B2* | 11/2004 | Sands | A01G 25/09 47/1.01 R |
| 6,918,354 | B2* | 7/2005 | Perriello | A01K 61/20 119/231 |
| 7,770,814 | B2* | 8/2010 | Archambeau | B01F 27/271 261/87 |
| 2015/0313103 | A1* | 11/2015 | Yano | A01G 31/02 47/62 R |
| 2021/0146320 | A1* | 5/2021 | Tsuchiya | B01F 35/7176 |
| 2021/0244021 | A1* | 8/2021 | Ohdaira | B01F 23/238 |

FOREIGN PATENT DOCUMENTS

| | | |
|---|---|---|
| JP | H104789 A | 1/1998 |
| JP | 2009082903 A | 4/2009 |
| JP | 2010094117 A | 4/2010 |
| JP | 2011050293 A | 3/2011 |
| JP | 2011110028 A | 6/2011 |
| JP | 2013247949 A | 12/2013 |
| JP | 2015020165 A | 2/2015 |
| JP | 2018174912 A | 11/2018 |
| JP | 2019118332 A | 7/2019 |
| WO | 2019230754 A1 | 12/2019 |

OTHER PUBLICATIONS

Kim, KR_20170061293_A (Year: 2017).*
CN_208691875_U (Year: 2019).*
International Search Report for International Application No. PCT/JP2020/045001; Date of Mailing, Feb. 16, 2021.
PCT International Preliminary Report on Patentability for International Application No. PCT/JP2020/045001; Dated Mar. 15, 2022.

* cited by examiner

PLANT CULTIVATION METHOD

CROSS REFERENCE TO RELATED APPLICATIONS

This is the U.S. national stage of application No. PCT/JP2020/045001, filed on Dec. 3, 2020. Priority under 35 U.S.C. § 119(a) and 35 U.S.C. § 365(b) is claimed from Japanese Application No. 2019-222398, filed Dec. 9, 2019, the disclosure of which is also incorporated herein by reference.

TECHNICAL FIELD

The present invention relates to a technique of a plant cultivation method and a plant cultivation device, and more particularly to a technique of a plant cultivation method and a plant cultivation device that carries out plant cultivation by supplying a nutrient liquid in mist form.

BACKGROUND ART

Conventionally, there are known a plant cultivation method and a plant cultivation device that use an irrigation system for automatically irrigating a plant to intermittently supply a nutrient liquid necessary for plant growth to the plant (See, for example, Patent Literature 1). In such a plant cultivation device and a plant cultivation method that intermittently supply a nutrient liquid to a plant, a method is known in which in order to realize an optimum environment for plant growth, the environment in the culture soil at the time of supplying the nutrient liquid is focused on and a gas such as air is supplied into the culture soil at the time of supplying the nutrient liquid (See, for example, Patent Literature 1).

However, in a case where a gas such as air is supplied into the culture soil, the amount of oxygen taken in from the roots is limited. In contrast, a plant frequently takes in carbon dioxide for photosynthesis or takes in oxygen for respiration in the vicinity of pores in the leaf surface. For this reason, it has been desired to supply a gas such as air to the vicinity of pores in the leaf surface.

CITATION LIST

Patent Literature

Patent Literature 1: JP-A 2019-118332 Gazette

SUMMARY OF INVENTION

Technical Problems

Therefore, in view of the above problems, an object of the present invention is to provide a plant cultivation method and a plant cultivation device that, through the efficient supply of a required gas to the leaf surface, promote plant growth and improve plant quality.

Solutions to Problems

The problems to be solved by the present invention are as described above and means for solving the problems will be described below.

That is, the present invention provides a plant cultivation method that uses a nutrient liquid supply device which supplies a nutrient liquid to a plant, a fine bubble-generating device which feeds a gas in the form of fine bubbles into the nutrient liquid supplied from the nutrient liquid supply device, a spraying device which converts the fine bubble-containing nutrient liquid into a mist, and a control device which controls the nutrient liquid supply device, the fine bubble-generating device, and the spraying device and carries out plant cultivation by supplying the nutrient liquid in mist form, the plant cultivation method including:

a first step in which an oxygen-containing gas used as the gas is supplied by the fine bubble generating device as the fine bubble which each have a diameter of several hundred nm in several μm into the nutrient liquid and the fine bubble supplied by the fine bubble-generating device is contained into the nutrient liquid which becomes water droplets in mist form sprayed from the spraying device which each have a particle diameter of several tens μm to several hundred μm and the fine bubble-containing nutrient liquid is sprayed on the leaf surface of a plant; and
- a second step in which, after the first step, a carbon dioxide-containing gas used as the gas is supplied by the fine bubble-generating device as the fine bubble which each have a diameter of several hundred nm to several μm into the nutrient liquid and the fine bubble supplied by the fine bubble-generating device is contained into the nutrient liquid which becomes water droplets in mist form sprayed from the spraying device which each have a particle diameter of several tens μm to several hundred μm, and the fine bubble-containing nutrient liquid is sprayed on the leaf surface of the plant.

The present invention may further include a third step in which an ozone-containing gas is supplied as the gas into the nutrient liquid and the fine bubble-containing nutrient liquid is sprayed on the leaf surface of the plant.

Furthermore, the present invention includes a nutrient liquid supply device that supplies a nutrient liquid to a plant, a fine bubble-generating device that feeds a gas in the form of fine bubbles into the nutrient liquid supplied from the nutrient liquid supply device, a spraying device that converts the fine bubble-containing nutrient liquid into a mist, and a control device that controls the nutrient liquid supply device, the fine bubble-generating device, and the spraying device,

- the control device controlling the nutrient liquid supply device, the fine bubble-generating device, and the spraying device so as to carry out
- a first step in which an oxygen-containing gas used as the gas is supplied by the fine bubble-generating device as the fine bubble which each have a diameter of several hundred nm to several μm into the nutrient liquid and the fine bubble supplied by the fine bubble-generating device is contained into the nutrient liquid which becomes water droplets in mist form sprayed from the spraying device which each have a particle diameter of several tens μm to several hundred μm, and the fine bubble-containing nutrient liquid is sprayed on the leaf surface of a plant, and
- a second step in which, after the first step, a carbon dioxide-containing gas used as the gas is supplied by the fine bubble-generating device as the fine bubble which each have a diameter of several hundred nm to several μm into the nutrient liquid and the fine bubble supplied by the fine bubble-generating device is contained into the nutrient liquid which becomes water droplets in mist form sprayed from the spraying device which each have a particle diameter of several tens μm to several hundred μm, and the fine bubble-containing nutrient liquid is sprayed on the leaf surface of the plant.

The present invention may further include a supply pipe, and the fine bubble-generating device may be configured to be detachable from a middle portion of the supply pipe.

Advantageous Effects of Invention

The effects of the present invention are as follows.

In the present invention, oxygen necessary for respiration and carbon dioxide necessary for photosynthesis are contained in the form of fine bubbles in the nutrient liquid in mist form sprayed on the leaf surface, whereby plant growth can be promoted, and plant quality can be improved.

DESCRIPTION OF EMBODIMENT

Next, an embodiment of the invention will be described.

First, an overall configuration of a plant cultivation device 1 according to an embodiment of the present invention will be described with reference to FIG. 1.

Figure 1:
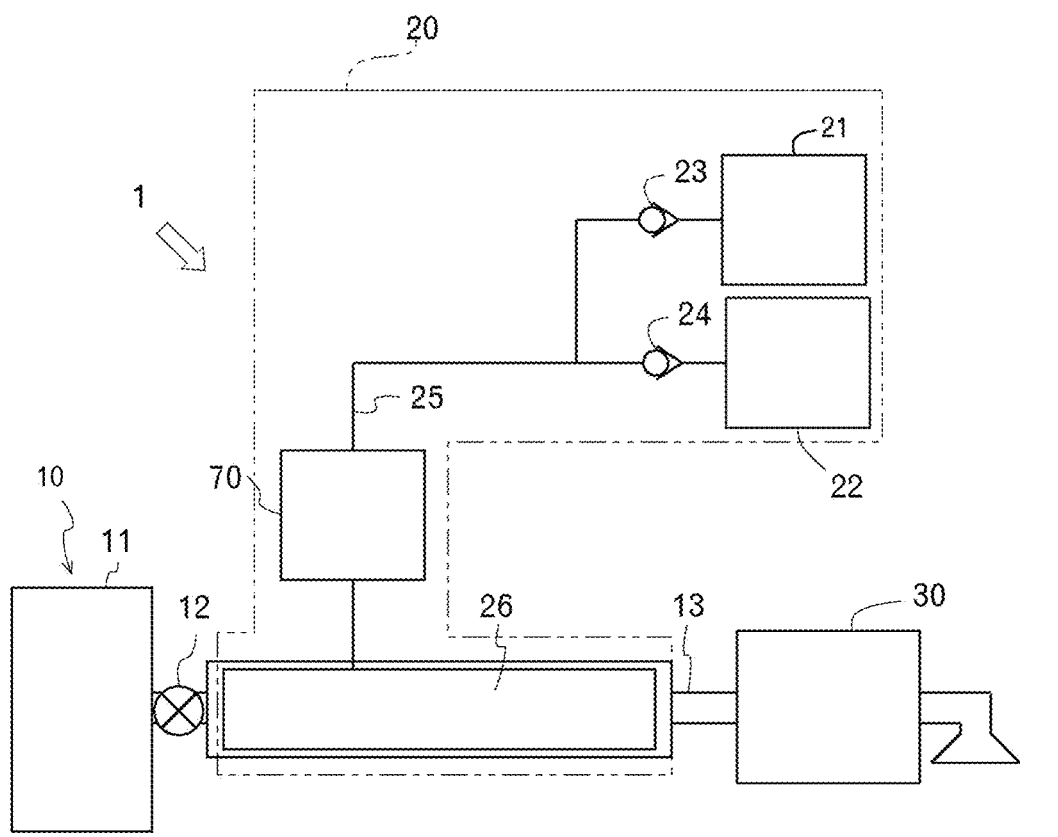
FIG. 1 is a schematic front view illustrating a plant cultivation device according to one embodiment of the present invention.
Figure 1:
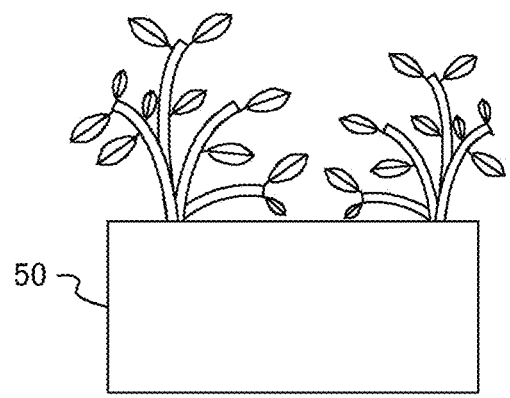

As illustrated in FIG. 1, the plant cultivation device 1 includes culture soil 50 in which a plant is planted, a nutrient liquid supply device 10 that supplies a nutrient liquid to the plant, a fine bubble-generating device 20 that feeds a gas in the form of fine bubbles into the nutrient liquid supplied from the nutrient liquid supply device 10, a spraying device 30 that converts the fine bubble-containing nutrient liquid into a mist, a control device 40 (see FIG. 3) that controls the nutrient liquid supply device 10, the fine bubble-generating device 20, and the spraying device 30, and an environment measurement sensor group 60 (see FIG. 3) that includes a plurality of sensors for measuring environmental values such as temperature and humidity in the culture soil 50.

The plant cultivation device 1 is a device for growing a plant in the culture soil 50. In lieu of the culture soil 50, a water tank may be used when hydroponic cultivation is carried out. Further, the culture soil 50 may be filled in a cultivation container or may be used in a field.

Figure 3:
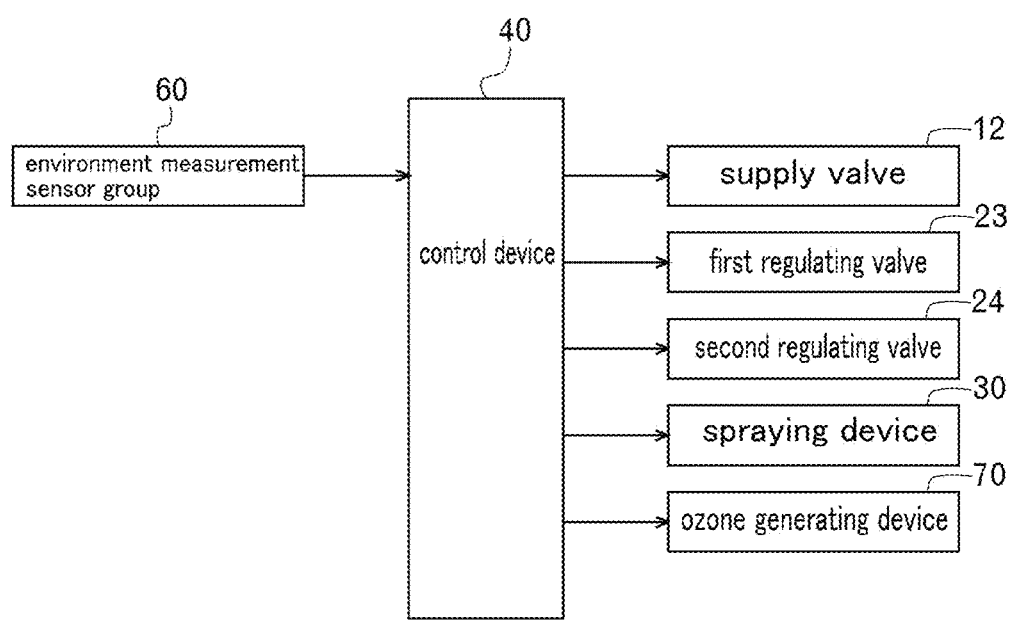
FIG. 3 is a block diagram illustrating a control device according to one embodiment of the present invention.

The nutrient liquid supply device 10 is a device that supplies the nutrient liquid to the spraying device 30, and includes a nutrient liquid tank 11, a supply valve 12, and a supply pipe 13. As illustrated in FIG. 3, the supply valve 12 is connected to the control device 40. The supply pipe 13 is connected to the spraying device 30 and is configured to be able to supply the nutrient liquid to the spraying device 30 through the supply pipe 13 when the supply valve 12 is opened. As the nutrient liquid, for example, water in which a liquid fertilizer or the like is dissolved is used.

The fine bubble-generating device 20 is a device that generates fine bubbles in the nutrient liquid. The fine bubbles are fine bubbles which each have a diameter of several hundred nm to several μm, and do not float on the water surface but continue to exist in the nutrient liquid. In addition, the fine bubbles have a property of generating a very high interfacial tension. Interfacial tension is generated between the fine bubbles and the liquid phase including the base fluid or the like, and the fine bubbles are more likely to become smaller by pressure. The fine bubble-generating device 20 includes an oxygen storage container 21 that stores oxygen to be fine bubbles, a carbon dioxide storage container 22 that stores carbon dioxide to be fine bubbles, a first regulating valve 23 that regulates a supply amount from the oxygen storage container 21, a second regulating valve 24 that regulates a supply amount from the carbon dioxide storage container 22, a gas passage 25 through which a gas passes, and a fine bubble-generating medium 26 for generating fine bubbles of a gas sent from the gas passage 25 in the nutrient liquid.

The oxygen storage container 21 is a container that stores oxygen in a high pressure state.

The carbon dioxide storage container 22 is a container that stores carbon dioxide in a high pressure state.

The first regulating valve 23 is a valve that regulates the pressure of oxygen stored in the oxygen storage container 21 by the opening degree of the valve. As illustrated in FIG. 3, the first regulating valve 23 is connected to the control device 40, and the opening degree thereof is controlled by the control device 40.

The second regulating valve 24 is a valve that regulates the pressure of carbon dioxide stored in the carbon dioxide storage container 22 by the opening degree of the valve. As illustrated in FIG. 3, the second regulating valve 24 is connected to the control device 40, and the opening degree thereof is controlled by the control device 40.

The gas passage 25 includes a passage connected to the oxygen storage container 21 side, a passage connected to the carbon dioxide storage container 22 side, and a passage communicating with the two passages and communicating with the bubble-generating medium 26.

Figure 2:
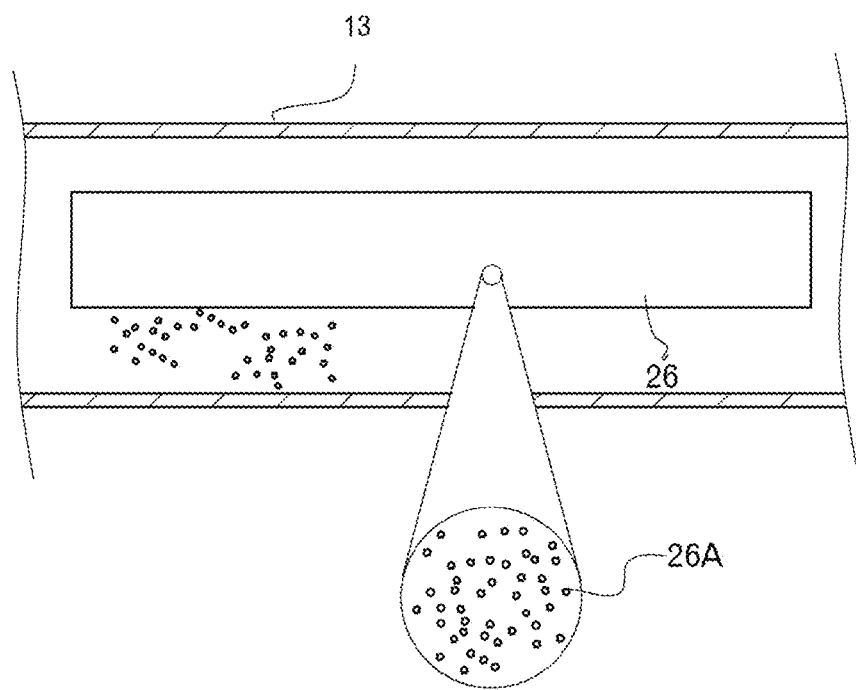
FIG. 2 is a partial front cross-sectional view illustrating a bubble-generating medium according to one embodiment of the present invention.

The fine bubble-generating medium 26 is made of a carbon-based porous material, and as illustrated in FIG. 2, has a large number of fine pores 26A which each have a diameter of several μm to several tens μm. The bubble-generating medium 26 is a conductor, and the bubbles generated from the bubble-generating medium 26 are negatively charged. In other words, while fine bubbles are passing through the bubble-generating medium 26, which is a conductor, free electrons are added to the fine bubbles, so that the fine bubbles are negatively charged. Due to the negative charges, the bubbles repel each other and are prevented from coalescing into large bubbles.

The bubble-generating medium 26 is configured to be detachable from a middle portion of the supply pipe 13. For example, by replacing part of the supply pipe 13 with a unit in which the bubble-generating medium 26 is disposed in a pipe having the same pipe diameter, the bubble-generating medium 26 can be easily attached inside the existing supply pipe 13.

The carbon-based porous material is a composite material containing only carbon or carbon and ceramic and is an inorganic material. A film having a thickness of several nm is formed on the surface of the carbon-based porous material. The film is formed of an inorganic film containing silicon.

The spraying device 30 is a device that sprays the fine bubble-containing nutrient liquid supplied from the fine bubble-generating device 20 on the leaf surface in mist form.

In the present embodiment, the spraying device 30 is configured as an atomization device that sprays the compressed nutrient liquid from a nozzle to produce a mist. The spraying device 30 is provided at least above the culture soil 50. Preferably, the spraying device 30 is arranged at a position higher than the height of the plant. As illustrated in FIG. 3, the spraying device 30 is connected to the control device 40, and the spraying time and the spray amount of the nutrient liquid is controlled by the control device 40.

Water droplets in mist form sprayed from the spraying device 30 each have a particle diameter of several tens µm to several hundred µm and contain fine bubbles therein.

The control device 40 is a device that controls the spray amount of the nutrient liquid, the spraying time, and the type and amount of the fine bubbles. As illustrated in FIG. 3, the control device 40 is connected to the environment measurement sensor group 60 on the input side.

The environment measurement sensor group 60 is a sensor group that measures the moisture content in the culture soil 50, the humidity around the plant, and the temperature. The environment measurement sensor group may include an atmospheric pressure sensor, an ozone concentration sensor, a PH sensor, and the like in addition to a temperature sensor and a humidity sensor.

Next, a plant cultivation method using the plant cultivation device 1 will be described.

Moisture and nutrients are given to the plant planted in the culture soil 50 by nutrient liquid spraying. The control device 40 controls the nozzle opening of the spraying device 30 to switch spraying of the nutrient liquid. For example, in a case where the ambient temperature measured by the environment measurement sensor group 60 is equal to or higher than a predetermined temperature and the ambient humidity is equal to or lower than a predetermined ratio, the nozzle is opened to spray the nutrient liquid. The nutrient liquid is sprayed from above the plant. As a result, the nutrient liquid in mist form is easily attached to the leaf surface of the plant. Fine water droplets of the nutrient liquid that is attached aggregate into water droplets of about several mm to several cm, and fine bubbles are contained in the water droplets without being ruptured.

In addition, in a case where the nutrient liquid is not sprayed or in a case where the fine bubble-generating device 20 is maintained, supply of the nutrient liquid can be stopped by causing the control device 40 to close the supply valve 12.

As a first step of nutrient liquid spraying, a gas containing oxygen is supplied into the nutrient liquid, and the fine bubble-containing nutrient liquid is sprayed on the leaf surface of the plant. In the first step, the control device 40 increases the opening degree of the first regulating valve 23 to cause the bubble-generating medium 26 to dissolve oxygen in the form of fine bubbles into the nutrient liquid. That is, by making the nutrient liquid contain oxygen necessary for respiration of plants in the form of fine bubbles, a nutrient liquid rich in oxygen is generated. By spraying the nutrient liquid rich in oxygen on the leaf surface, the oxygen concentration near the leaf surface locally increases. Thus, the respiratory activity of the plant is activated, and growth is promoted.

Note that it is preferable that the timing of starting supply of oxygen is the same as the timing of starting supply of the nutrient liquid in the first step; however, it is not always necessary that the timings match.

As a second step of the nutrient liquid spraying, a gas containing carbon dioxide is supplied into the nutrient liquid, and the fine bubble-containing nutrient liquid is sprayed on the leaf surface of the plant. In the second step, the control device 40 increases the opening degree of the second regulating valve 24 to cause the bubble-generating medium 26 to dissolve carbon dioxide in the form of fine bubbles into the nutrient liquid. The opening degree of the nozzle of the spraying device 30 is increased. As a result, the average particle diameter of the nutrient liquid in mist form becomes about several hundred µm. That is, by making the nutrient liquid contain carbon dioxide necessary for photosynthesis of plants in the form of fine bubbles in the nutrient liquid, the concentration of carbon dioxide near the leaf surface is locally improved. Therefore, the nutrient liquid in mist form activates the photosynthesis activity of the plant and promotes growth of the plant.

Note that it is preferable that the timing of starting supply of carbon dioxide is the same as the timing of starting supply of the nutrient liquid in the second step; however, it is not always necessary that the timings match.

The order of the first step and the second step may be reversed. The time required for each step may also be changed.

As a further step, a gas containing ozone may be supplied into the nutrient liquid, and the fine bubble-containing nutrient liquid may be sprayed on the leaf surface of the plant. In this step, ozone is generated from oxygen by using an ozone generating device 70 which is separately provided. Note that this step may be performed before or after the first step or the second step. That is, it is possible to first supply a gas containing ozone into the solution in order to improve soil, and it is also possible to supply a gas containing ozone into the solution after the second step in order to carry out pest control and prevent disease.

As illustrated in FIG. 1, the ozone generating device 70 is provided in a middle portion of the gas passage 25. The ozone generating device 70 is a device that generates ozone by applying energy to oxygen by silent discharge. As illustrated in FIG. 3, the ozone generating device 70 is connected to the control device 40. The control device 40 increases the opening degree of the first regulating valve 23 to supply oxygen into the gas passage 25. In the ozone generating device 70, energy is applied to oxygen in the gas passage 25 to convert oxygen into ozone, and ozone is sent to the bubble-generating medium 26. The bubble-generating medium 26 causes ozone to be dissolved in the form of fine bubbles in the nutrient liquid. The ozone concentration in the nutrient liquid is preferably 10 ppm to 20 ppm. That is, by making the nutrient liquid contain ozone necessary for sterilizing various bacteria attached to plants in the form of fine bubbles, the concentration of ozone near the leaf surface is locally improved. Therefore, various bacteria attached to the leaf surface of the plant are sterilized, and diseases and the like can be prevented.

As described above, provided is the plant cultivation method that uses the nutrient liquid supply device 10 which supplies a nutrient liquid to a plant, the fine bubble-generating device 20 which feeds a gas in the form of fine bubbles into the nutrient liquid supplied from the nutrient liquid supply device 10, the spraying device 30 which converts the fine bubble-containing nutrient liquid into a mist, and the control device 40 which controls the nutrient liquid supply device 10, the fine bubble-generating device 20, and the spraying device 30 and carries out plant cultivation by supplying the nutrient liquid in mist form, the plant cultivation method including: the first step in which an oxygen-containing gas is supplied as the gas into the nutrient liquid and the fine bubble-containing nutrient liquid is sprayed on the leaf surface of a plant; and the second step in which, after the first step, a carbon dioxide-containing gas is supplied as the gas into the nutrient liquid and the fine bubble-containing nutrient liquid is sprayed on the leaf surface of the plant.

With such a configuration, oxygen necessary for respiration and carbon dioxide necessary for photosynthesis are contained in the form of fine bubbles in the nutrient liquid in mist form sprayed on the leaf surface, whereby plant growth can be promoted, and plant quality can be improved.

The plant cultivation method may further include a third step in which, after the second step, an ozone-containing gas is supplied as the gas into the nutrient liquid and the fine bubble-containing nutrient liquid is sprayed on the leaf surface of the plant.

With such a configuration, by making the nutrient liquid contain ozone necessary for sterilizing various bacteria attached to the plant in the form of fine bubbles, the concentration of ozone near the leaf surface is locally improved.

Therefore, various bacteria attached to the leaf surface of the plant are sterilized, and diseases and the like can be prevented.

Furthermore, the supply pipe 13 is provided, and the fine bubble-generating medium 26 of the fine bubble-generating device 20 is configured to be detachable from a middle portion of the supply pipe 13.

With such a configuration, the bubble-generating medium 26 can be easily attached inside the existing supply pipe 13.

INDUSTRIAL APPLICABILITY

The present invention can be used for a technique of a plant cultivation method and a plant cultivation device, and more particularly can be used for a technique of a plant cultivation method and a plant cultivation device that carry out plant cultivation by supplying a nutrient liquid in mist form.

REFERENCE SIGNS LIST 1 plant cultivation device
10 nutrient liquid supply device
11 nutrient liquid tank
12 supply valve
13 supply pipe
20 fine bubble-generating device
21 oxygen storage container
22 carbon dioxide storage container
23 first regulating valve
24 second regulating valve
25 gas passage
26 bubble-generating medium
30 spraying device
40 control device
50 culture soil
60 environment measurement sensor group
70 ozone generating device

The invention claimed is:

1. A plant cultivation method that uses a nutrient liquid supply device which supplies a nutrient liquid to a plant, a fine bubble-generating device which feeds a gas in a form of fine bubbles into the nutrient liquid supplied from the nutrient liquid supply device, a spraying device which converts the fine bubble-containing nutrient liquid into a mist, and a control device which controls the nutrient liquid supply device, the fine bubble-generating device, and the spraying device and carries out plant cultivation by supplying the nutrient liquid in mist form, the plant cultivation method comprising:
   supplying an oxygen-containing gas used as the gas, by the fine bubble-generating device, as the fine bubble which each have a diameter of several hundred nm to several μm into the nutrient liquid, the oxygen-containing gas being generated by controlling a first regulating valve including an end connected to an oxygen storage container including oxygen only;
   containing the fine bubble supplied by the fine bubble-generating device into the nutrient liquid which becomes water droplets in mist form sprayed from the spraying device which each have a particle diameter of several tens μm to several hundred μm;
   negatively charging the fine bubble by the fine bubble-generating device;
   spraying the fine bubble-containing nutrient liquid on a leaf surface of a plant;
   after the spraying the fine bubble-containing nutrient liquid, supplying a carbon dioxide-containing gas used as the gas, by the fine bubble-generating device, as the fine bubble which each have a diameter of several hundred nm to several μm into the nutrient liquid, the carbon dioxide-containing gas being generated by controlling a second regulating valve including an end separated from the end of the first regulating valve and connected to a carbon dioxide storage container separated from the oxygen storage container and including carbon dioxide only;
   containing the fine bubble supplied by the fine bubble-generating device into the nutrient liquid which becomes water droplets in mist form sprayed from the spraying device which each have a particle diameter of several tens μm to several hundred μm; and
   spraying the fine bubble-containing nutrient liquid on the leaf surface of the plant,
   wherein the second regulating valve and the first regulating valve are commonly connected to a gas passage to which an ozone generating device is connected.

2. The plant cultivation method according to claim 1 further comprising:
   supplying an ozone-containing gas as the gas into the nutrient liquid; and
   spraying the fine bubble-containing nutrient liquid on the leaf surface of the plant,
   wherein the ozone concentration in the nutrient liquid is 10 ppm to 20 ppm.

* * * * *